(12) United States Patent
Lee et al.

(10) Patent No.: US 9,885,917 B2
(45) Date of Patent: Feb. 6, 2018

(54) LIQUID CRYSTAL DISPLAY PANEL AND METHOD FOR MANUFACTURING THE SAME

(71) Applicant: Samsung Display Co., Ltd., Yongin, Gyeonggi-Do (KR)

(72) Inventors: Taek Joon Lee, Hwaseong-si (KR); Tae Jin Kong, Bucheon-si (KR); Sang Gyun Kim, Hwaseong-si (KR); Su Jeong Kim, Seoul (KR); Seul Gee Lee, Seoul (KR)

(73) Assignee: Samsung Display Co., Ltd, Yongin-si (KR)

( * ) Notice: Subject to any disclaimer, the term of this patent is extended or adjusted under 35 U.S.C. 154(b) by 207 days.

(21) Appl. No.: 14/641,134

(22) Filed: Mar. 6, 2015

(65) Prior Publication Data

US 2016/0077383 A1    Mar. 17, 2016

(30) Foreign Application Priority Data

Sep. 15, 2014    (KR) ........................ 10-2014-0122076

(51) Int. Cl.
  *G02F 1/1337*    (2006.01)
  *G02F 1/1343*    (2006.01)
  *G02F 1/1339*    (2006.01)
  *G02F 1/1333*    (2006.01)

(52) U.S. Cl.
  CPC ...... *G02F 1/133723* (2013.01); *G02F 1/1339* (2013.01); *G02F 2001/133311* (2013.01); *G02F 2001/133388* (2013.01)

(58) Field of Classification Search
  CPC ............ G02F 1/133723; G02F 1/1339; G02F 2001/133311; G02F 2001/133388
  See application file for complete search history.

(56) References Cited

U.S. PATENT DOCUMENTS

2007/0269936 A1* 11/2007 Tanaka ................ G02F 1/13458
                                              438/133
2014/0176847 A1*  6/2014 Sung .................. H01L 51/5246
                                              349/58

FOREIGN PATENT DOCUMENTS

| KR | 10-2006-0086738 A | 8/2006 |
| KR | 10-2006-0122737 A | 11/2006 |
| KR | 10-1096687 A | 12/2011 |
| KR | 10-1290078 B1 | 7/2013 |
| KR | 10-1293017 B1 | 8/2013 |
| KR | 10-2014-0038242 A | 3/2014 |

\* cited by examiner

*Primary Examiner* — Bumsuk Won
*Assistant Examiner* — Jacob R Stern
(74) *Attorney, Agent, or Firm* — H.C. Park & Associates, PLC

(57) ABSTRACT

A liquid crystal display panel and a method for manufacturing the same. The liquid crystal display panel includes lower substrate having a first substrate; an upper substrate having a second substrate that is opposite to the first substrate; a liquid crystal layer is disposed between the lower and upper substrates such that liquid crystals are arranged in a first region between the first substrate and the second substrate; and a dam pattern arranged in a second region which surrounds a circumference of the first region as a region between the first substrate and the second substrate, the dam pattern having both a physical barrier function and a chemical barrier function.

8 Claims, 14 Drawing Sheets

LIQUID CRYSTAL DISPLAY PANEL AND METHOD FOR MANUFACTURING THE SAME

CLAIM OF PRIORITY

This application makes reference to, incorporates the same herein, and claims all benefits accruing under 35 U.S.C § 119 from an application earlier filed in the Korean Industrial Property Office on 15 Sep. 2014, and there duly assigned Serial No. 10-2014-0122076 by that Office.

BACKGROUND OF THE INVENTION

Field of the Invention

The present invention relates to a liquid crystal display panel, and more particularly to a liquid crystal display panel that includes a dam pattern having both a physical barrier function and a chemical barrier function, and a method for manufacturing the same.

Description of the Related Art

In general, a liquid crystal display panel for displaying an image includes a thin film transistor substrate in which thin film transistors (TFTs) are formed for respective pixels to independently drive the pixels, and an opposite substrate that is opposite to the thin film transistor substrate through a liquid crystal layer.

The liquid crystal display panel is divided into a display region in which an image is actually displayed and a non-display region that surrounds the display region. A pixel unit that includes a gate line, a data line, and a thin film transistor is formed in the display region, and a gate driving unit that applies a gate signal to a gate line is formed in the non-display region.

Recently, in order to reduce the area of the liquid crystal display panel, a structure that reduces the width of the non-display region has been developed. For example, a structure that maximally reduces the width of a light blocking layer that is formed in the non-display region of the opposite substrate and the width of a seal line that attaches the display substrate and the opposite substrate to each other has been developed.

As described above, if the width of the non-display region is reduced, an alignment layer and the seal line overlap each other. However, the adhesive force of the overlapping region of the alignment layer and the seal line may deteriorate, and thus the thin film transistor substrate and the opposite substrate of the liquid crystal display panel may be separated from each other.

Further, the water vapor permeability of the seal line is improved to cause the occurrence of corrosion and edge afterimage.

SUMMARY OF THE INVENTION

Accordingly, one subject to be solved by the present invention is to provide a liquid crystal display panel, which can physically and chemically control spreading of an alignment layer solution so as to prevent the alignment layer solution from permeating into a seal line forming region when an alignment layer is formed in a solution process.

Additional advantages, subjects, and features of the invention will be set forth in part in the description which follows and in part will become apparent to those having ordinary skill in the art upon examination of the following or may be learned from practice of the invention.

In one aspect of the present invention, there is provided a liquid crystal display panel comprising: a first substrate; a second substrate that is opposite to the first substrate; a liquid crystal layer arranged in a first region between the first substrate and the second substrate; and a dam pattern arranged in a second region which surrounds a circumference of the first region as a region between the first substrate and the second substrate, and has an uppermost surface having a contact angle that is equal to or larger than 17° and equal to or smaller than 85° with respect to distilled water, wherein an overlayer does not exist on a surface of the uppermost surface.

The uppermost surface of the dam pattern may be made of only photoresist for manufacturing color filters.

The dam pattern may have a single-layer structure that is made of only photoresist for manufacturing color filters.

The liquid crystal display panel may further comprise a stacked structure of a thin film transistor (TFT) layer formed between the liquid crystal layer and the first substrate, a color filter layer formed between the liquid crystal layer and the thin film transistor (TFT) layer, a silicon nitride (SiNx) planarization layer formed between the liquid crystal layer and the color filter layer, a pixel electrode formed between the liquid crystal layer and the planarization layer, and a polyimide-based alignment layer formed between the liquid crystal layer and the pixel electrode.

The overlayer may be the planarization layer and/or the polyimide-based alignment layer.

The uppermost surface may have a contact angle that is equal to or larger than 5° and equal to or smaller than 18° with respect to polyimide.

In another aspect of the present invention, there is provided a liquid crystal display panel comprising: a first substrate; a second substrate that is opposite to the first substrate; a liquid crystal layer arranged in a first region between the first substrate and the second substrate; a stacked structure of a thin film transistor (TFT) layer formed between the liquid crystal layer and the first substrate, a color filter layer formed between the liquid crystal layer and the thin film transistor (TFT) layer, a silicon nitride (SiNx) planarization layer formed between the liquid crystal layer and the color filter layer, a pixel electrode formed between the liquid crystal layer and the planarization layer, and a polyimide-based alignment layer formed between the liquid crystal layer and the pixel electrode; and a dam pattern arranged in a second region which surrounds a circumference of the first region as a region between the first substrate and the second substrate, and has an uppermost surface that is made of only a photoresist composite for manufacturing color filters, wherein the planarization layer and the polyimide-based alignment layer do not exist on the uppermost surface.

The uppermost surface has a contact angle that is equal to or larger than 17° and equal to or smaller than 85° with respect to distilled water.

The uppermost surface has a contact angle that is equal to or larger than 5° and equal to or smaller than 18° with respect to polyimide.

The dam pattern may have a single-layer structure that is made of only photoresist for manufacturing color filters.

In another aspect of the present invention, there is provided a method for manufacturing a liquid crystal display panel, comprising: spreading a photoresist composite for manufacturing color filters on a first substrate on which a thin film transistor (TFT) layer is formed; simultaneously forming a color filter layer and a dam pattern that surrounds the color filter layer by exposing and developing the photoresist composite for manufacturing the color filter; and forming a silicon nitride planarization layer on the color filter layer by depositing silicon nitride (SiNx) thereon after protecting the dam pattern by a mask.

The dam pattern may be made of only the photoresist composite for manufacturing the color filters, which has a contact angle that is equal to or larger than 17° and equal to or smaller than 85° with respect to distilled water.

The dam pattern may be made of only the photoresist composite for manufacturing the color filters, which has a contact angle that is equal to or larger than 5° and equal to or smaller than 18° with respect to polyimide.

The method may further comprise forming an alignment layer by spreading and hardening a polyimide alignment layer solution after forming the planarization layer. A polyimide-based alignment layer does not exist on a surface of the dam pattern.

According to the embodiments of the present invention, at least the following effects can be achieved.

The coating properties of the polyimide alignment layer with respect to the surface of the exposed uppermost surface can be lowered when the surface of the uppermost surface of the dam pattern comes in direct contact with the alignment layer in the alignment layer forming step.

The dam pattern according to the embodiments of the present invention can serve as both a physical barrier and a chemical barrier with respect to the polyimide alignment layer.

In the liquid crystal display panel according to the embodiments of the present invention, the overlapping of the seal line and the alignment layer can be minimized.

The effects according to the present invention are not limited to the contents as exemplified above, but further various effects are included in the description.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
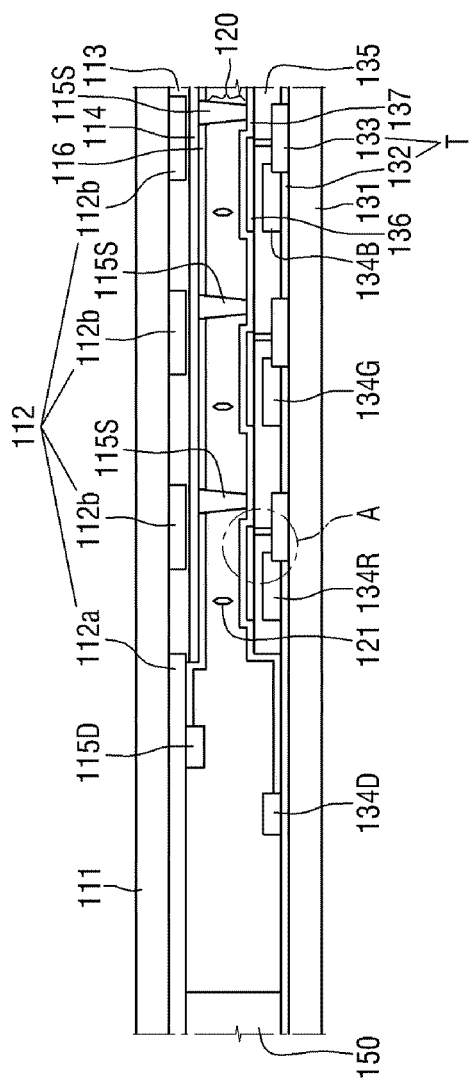
FIG. 1 is a cross-sectional view of a schematic portion of a liquid crystal display panel according to a first embodiment of the present invention.

Features of the inventive concept and methods of accomplishing the same may be understood more readily by reference to the following detailed description of preferred embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

Also, the terms "lower substrate" or "upper substrate" include, respectively, a first substrate or a second substrate and all the constituent elements formed on the first substrate or the second substrate.

Hereinafter, embodiments of the present invention will be described with reference to the accompanying drawings.

FIG. 1 is a cross-sectional view of a schematic portion of a liquid crystal display panel according to a first embodiment of the present invention.

Referring to FIG. 1, a liquid crystal display panel according to the first embodiment of the present invention may include a first region and a second region provided between a first substrate 131 and a second substrate 111 to be spatially separated from each other. The first region may be a display region, and the second region may be a non-display region.

In FIG. 1, the first region may be a region in which a liquid crystal layer 120 is interposed between the first substrate 131 and the second substrate 111, and the second region may be a region in which the liquid crystal layer 120 is not interposed between the first substrate 131 and the second substrate 111.

Referring to FIG. 1, the first region may include a structure in which the first substrate 131, a thin film transistor layer 130, color filter layers 134R, 134G, and 134B, a planarization layer 135, a pixel electrode 136, a first alignment layer 137, and the liquid crystal layer 120 are stacked in order between the first substrate 131 and the liquid crystal layer 120. The thin film transistor layer 130 may include a gate insulating layer 132 and a thin film transistor 133.

The second region may include a structure in which a gate insulating layer 132 and a first dam pattern 134D are stacked in order on the first substrate 131, or a structure in which the gate insulating layer 132 and the first alignment layer 137 are stacked in order on the first substrate 131.

On the other hand, the first region may include a structure in which the second substrate 111, a light blocking layer 112b, an overcoat layer 113, a common electrode 114, a spacer 115S, a common electrode 114, and the liquid crystal layer 120 are stacked in order between the second substrate 111 and the liquid crystal layer 120.

Further, the second region may include a structure in which a light blocking layer 122a, a second dam pattern 115D are stacked in order on the second substrate 111, or a structure in which the light blocking layer 122a and a second alignment layer 116 are stacked in order on the second substrate 111.

The seal line 150 may be formed in the second region, and may be interposed between the gate insulating layer 132 and a light blocking layer 112a to come in direct contact with them. The spacer 115S may be interposed between the common electrode 114 and the first alignment layer 137 to come in direct contact with them. The liquid crystal layer 120 may be interposed between the first alignment layer 137 and the second alignment layer 116, and may include optical anisotropic liquid crystals 121.

Referring to FIG. 1, an overlayer (e.g., a planarization layer and polyimide-based alignment layer) is not formed on one surface of the first dam pattern 134D, but the first alignment layer 137 is formed to extend from the first region to the second region. The first alignment layer 137 may not exceed the first dam pattern 134D. The first dam pattern 134D is illustrated to have a single-layer structure, but is not limited thereto.

The first dam pattern 134 can physically prevent an alignment layer solution from flowing up to a region in which the seal line 150 of the second region is to be formed in the process of forming the alignment layer in the first region in a liquid process, and also chemically prevent the alignment layer solution from flowing up to a seal line 150 forming region of the second region using the characteristics of a material of the first dam pattern 134D having no affinity with the alignment layer solution.

The material of the first dam pattern 134D is not specially limited if the material has no affinity with the alignment layer solution to the extent that the alignment layer solution is not coated thereon. As a non-limiting example, the first dam pattern 134D may be composed of a material having a contact angle that is equal to or larger than 17° and equal to or smaller than 85° with respect to distilled water. Contact angle measurements are often used as an empirical indicator of 'wettability' and interfacial tension. Further, the first dam pattern 134D may be composed of a material having the contact angle that is equal to or larger than 5° and equal to or smaller than 18° with respect to polyimide.

As a non-limiting example, the first dam pattern 134D may be composed of a photoresist composite for manufacturing a color filter, and more particularly, may be composed of a photoresist composite for manufacturing a blue (B) color filter 134B.

Hereinafter, referring to FIGS. 1 to 3, a process of forming the first dam pattern 134D of FIG. 1 as the photoresist composite for manufacturing the blue (B) color filter 134B will be described in detail.

Figure 2:
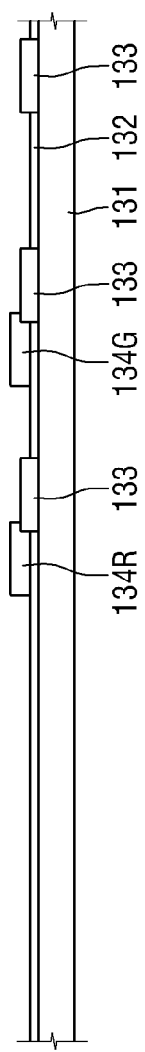
FIGS. 2 to 6 are cross-sectional views schematically illustrating a step of manufacturing a lower substrate of FIG. 1.

Referring to FIG. 2, the thin film transistor layer 130, the red (R) color filter 134R, and the green color filter 134G may be formed on the first substrate 131 in order.

The first substrate 131 may be composed of a transparent material that can transmit light. As a non-limiting example, the first substrate 131 may be a glass substrate or a transparent polymer film.

The thin film transistor layer 130 may include the gate insulating layer 132 and the thin film transistor 133, and the gate insulating layer 132 may be formed to extend from the first region to the second region. As a non-limiting example, the gate insulating layer 132 may be composed of a silicon oxide layer (SiO2).

The thin film transistor 130 is a switching device that applies and cuts off a signal to the liquid crystals 121. Hereinafter, the structure of the thin film transistor 130 will be described in detail with reference to region A shown in more detail in FIG. 7.

The red (R) color filter 134R may be formed by spreading, exposing, and developing the photoresist composite for manufacturing the red (R) color filter. The green (G) color filter 134G may be formed by spreading, exposing, and developing the photoresist composite for manufacturing the green (G) color filter. The forming order of the red (R) color filter 134R and the green (G) color filter 134G is not specially limited, and for example, in the case of a stripe pattern, the green (G) color filter 134G may be formed after the red (R) color filter 134R is formed.

Figure 3:
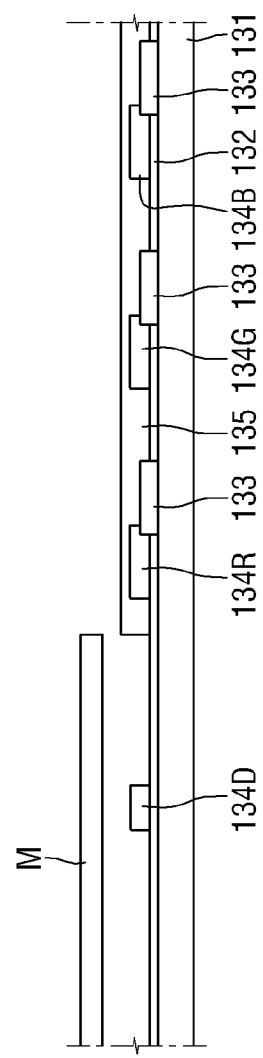

Referring to FIG. 3, the blue (B) color filter 134B may be formed after the red (R) color filter 134R and the green (G) color filter 134G are formed, and in this process, the first dam pattern 134D may be formed together. The blue (B) color filter 134B may be formed by spreading, exposing, and developing the photoresist composite for manufacturing the blue (B) color filter 134B. In the same manner, the first dam pattern 134D may be formed by spreading, exposing, and developing the photoresist composite for manufacturing the blue (B) color filter.

The planarization layer 135 may be formed after the blue (B) color filter 134B and the first dam pattern 134D are formed. In a process of forming the planarization layer 135, the first dam pattern 134D is protected by a mask M. Accordingly, the planarization layer 135 is formed only in the first region, but is not formed on the surface of the first dam pattern 134D of the second region. The planarization layer 135 may be formed by depositing silicon nitride (SiNx).

The silicon nitride SiNx has the contact angle that is smaller than 17° with respect to the distilled water, and has the contact angle that is smaller than 5° with respect to polyimide. Accordingly, the coating properties become superior in the case where the polyimide-based alignment layer comes in contact with the planarization layer 135 that includes silicon nitride (SiNx).

This means that if the planarization layer 135 that includes silicon nitride (SiNx) had been formed on the surface of the first dam pattern 134D to form the uppermost surface, the uppermost surface of the first dam pattern 134D could have been easily coated by the polyimide-based alignment layer.

According to the liquid crystal display panel according to the first embodiment of the present invention, since the surface of the uppermost surface of the first dam pattern 134D is composed of a material that has no affinity with the polyimide-based alignment layer, and the first dam pattern 134D is protected by the mask during deposition of the silicon nitride (SiNx), it becomes possible to make the polyimide-based alignment layer not easily coated on the first dam pattern 134D.

For example, in the case of forming the first dam pattern 134D only as the photoresist composite for manufacturing the blue (B) color filter, the contact angle thereof with respect to the distilled water is 85°, and the contact angle thereof with respect to the polyimide is 18°.

The coating properties of the polyimide-based alignment layer can be lowered by forming the first dam pattern 134 as the photoresist composite for manufacturing the blue (B) color filter having low surface energy.

Figure 4:
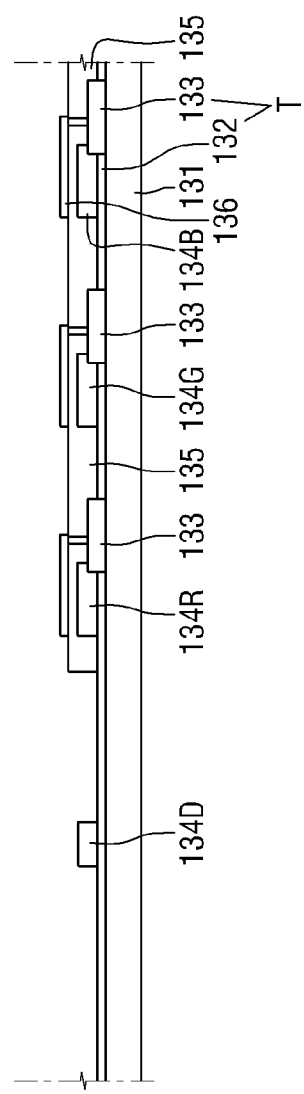
Figure 5:
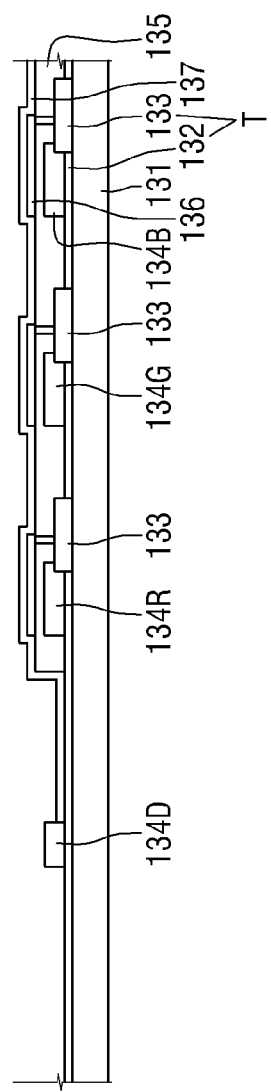

FIGS. 4 and 5 schematically illustrate a process of forming the pixel electrode 136 and the first alignment layer 137 on the planarization layer 135 to complete the lower substrate.

Referring to FIG. 4, after the planarization layer 135 is formed, the mask M may be removed, and the pixel electrode 136 may be formed on the planarization layer 135. The pixel electrode 136 may be provided to a region that corresponds to the color filter layers 134R, 134G, and 134B. The pixel electrode 136 may be made of a transparent conductive material. As a non-limiting example, the pixel electrode 136 may be made of ITO (Indium Tin Oxide).

Figure 7:
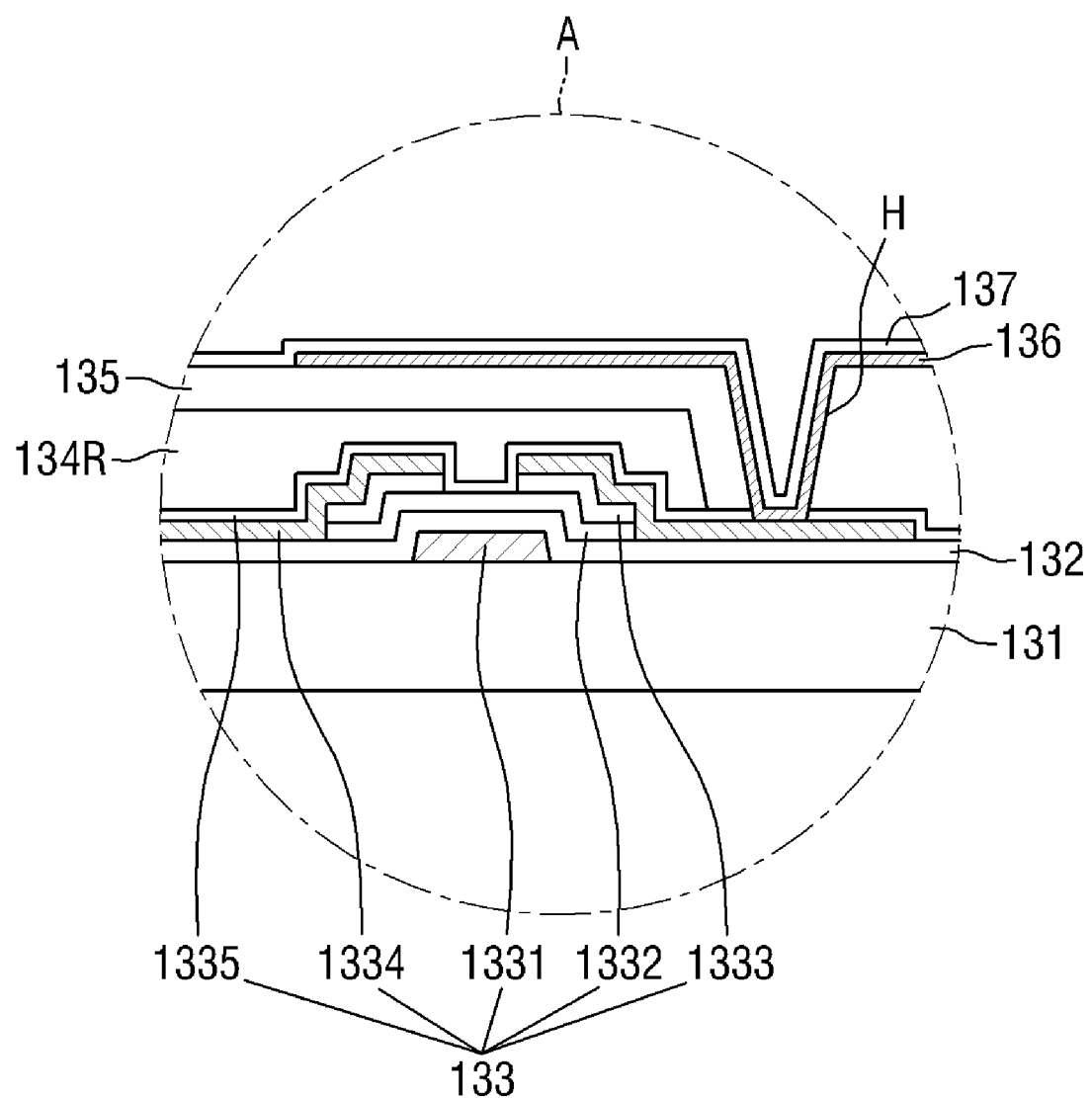
FIG. 7 is a schematic enlarged view of a region A of FIG. 1.

Referring to FIG. 7, region A of FIG. 1, the pixel electrode 136 may be electrically connected to a source/drain electrode 1334 through a through-hole H formed on the planarization layer 135.

Referring to FIG. 5, the first alignment layer 137 may be formed on one surface of the planarization layer 135 on which the pixel electrode 136 is formed. The first alignment layer 137 may guide easy arrangement of the liquid crystals 121. The first alignment layer 137 may be formed to extend from the first region to the second region. However, as described above, it is difficult for the first alignment layer 137 to flow up to the seal line 150 over the first dam pattern 134 due to the physical and chemical barrier functions of the first dam pattern 134D. The first alignment layer 137 may be a polyimide-based alignment layer.

Figure 6:
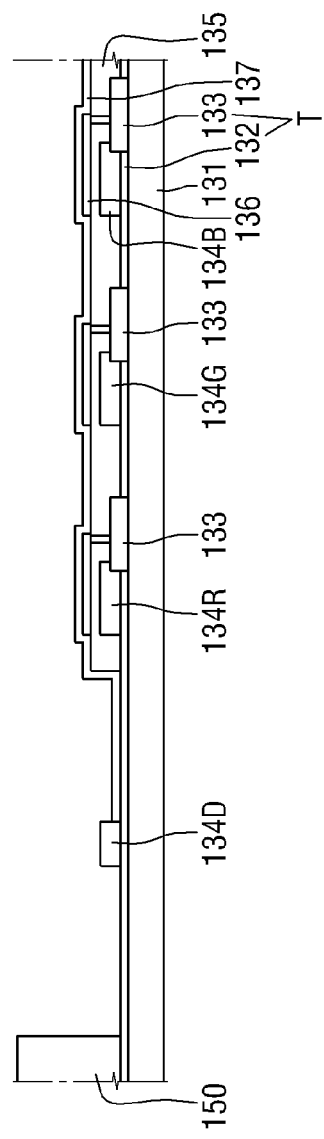

FIG. 6 schematically illustrates a step of forming the seal line 150 in the second region. The seal line 150 may be formed on the gate insulating layer 132 that is formed to extend from the first region to the second region, but is not limited thereto.

Based on the planarization layer 135 in the first region, the first dam pattern 134D and the seal line 150 may be formed in order. That is, the first dam pattern 134D is arranged between the seal line 150 and the first region.

FIG. 7 is a schematic enlarged view of a region A of FIG. 1.

Referring to FIG. 7, the thin film transistor 133 may include a gate electrode 1331, a semiconductor layer 1332, an ohmic contact layer 1333, a source/drain electrode 1334, and a passivation layer 1335.

The gate electrode 1331 may be made of a conductive material, such as metal. For example, the gate electrode 1331 may be made of at least one selected from the group including aluminum (Al), an aluminum alloy (AlNd), tungsten (W), chrome (Cr), titanium (Ti), and molybdenum (Mo).

The gate insulating layer 132 may be provided between the gate electrode 1331 and the semiconductor layer 1332.

The semiconductor layer 1332 may be provided on the gate insulating layer 132 that corresponds to the gate electrode 1331. The semiconductor layer 1332 may be made of pure amorphous silicon (a-Si:H).

The ohmic contact layer 1333 may be provided on the semiconductor layer 1332, and may be made of impurity-injected amorphous silicon (N+a-Si:H). The ohmic contact layer 1333 may expose a part of the surface of the semiconductor layer 1332, or may be formed in an inversion symmetry shape based on the region in which a part of the surface of the semiconductor layer 1332 is exposed.

The source/drain electrode 1334 may be provided on the ohmic contact layer 1333. In the same manner as the ohmic contact layer 1333, the source/drain electrode 1334 may expose a part of the surface of the semiconductor layer 1332, or may be formed in an inversion symmetry shape based on the region in which a part of the surface of the semiconductor layer 1332 is exposed.

The source/drain electrode 1334 may be made of at least one selected from the group including molybdenum (Mo), titanium (Ti), tungsten (W), tungsten molybdenum (MoW), chrome (Cr), nickel (Ni), aluminum (Al), and an aluminum alloy (AlNd).

In a gap section between the source/drain electrodes 1334 in which a part of the surface of the semiconductor layer 1332 is exposed, a channel (not illustrated) for turning on the source/drain electrode 1334 may be formed.

The passivation layer 1335 may be formed on the source/drain electrode 1334 and the exposed semiconductor layer 1332 to protect the source/drain electrode 1334 and the exposed semiconductor layer 1332. The passivation layer 1335 may be composed of a silicon oxide (SiO2) layer, a silicon nitride (SiNx) layer, or a double layer thereof.

Hereinafter, referring to FIGS. 1 and 8 to 12, a process of forming an upper substrate of the liquid crystal display panel of FIG. 1 will be described in detail.

Figure 8:
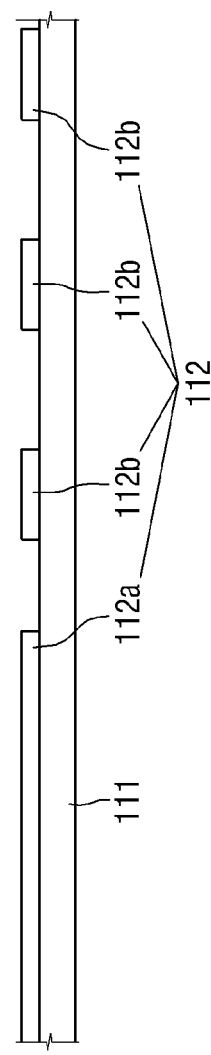
FIGS. 8 to 13 are cross-sectional views schematically illustrating a process of manufacturing an upper substrate of FIG. 1.

Referring to FIG. 8, a light blocking layer 112 may be formed on the second substrate 111. The light blocking layer 112 may include the light blocking layer 112a that is formed in the second region and the light blocking layer 112b that is formed in the first region.

The light blocking layer 112a may be in the shape of a closed loop that surrounds the first region to block light leakage. The light blocking layer 112b may be formed in a region that corresponds to the thin film transistor 133, a gate line (not illustrated), and a data line (not illustrated) to block light leakage.

Figure 9:
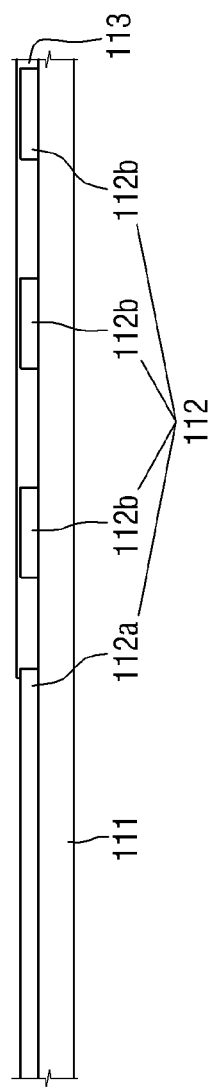

Referring to FIG. 9, the overcoat layer 113 may be formed on the light blocking layer 112b and partially on the light blocking layer 112a. The overcoat layer 113 is provided to improve surface planarization and adhesive force with the common electrode 114 (FIG. 10), and may be made of, for example, acrylic resin.

Figure 10:
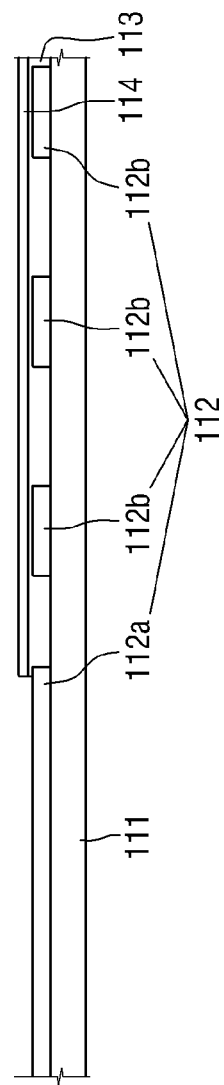

Referring to FIG. 10, the common electrode 114 may be formed on the overcoat layer 113. The common electrode 114 may be formed of a transparent conductive material. For example, the common electrode 114 may be made of ITO (indium Tin Oxide) or IZO (Indium Zinc Oxide).

Figure 11:
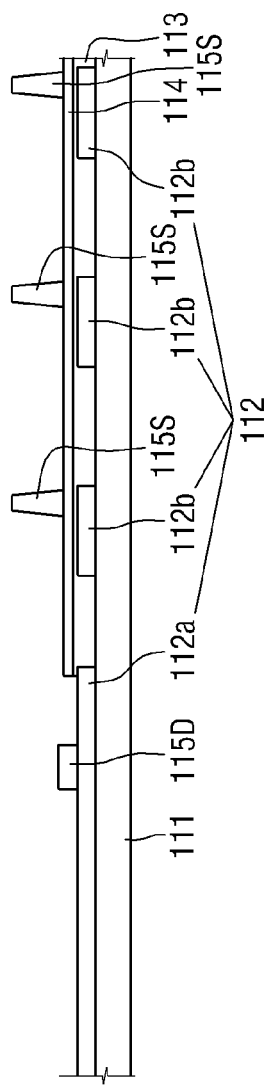

Referring to FIG. 11, the spacer 115S may be formed on the common electrode 114. In addition, the second dam pattern 115D may be formed on the light blocking layer 112a of the second region. The second dam pattern 115D may be formed of the same material in the same process as the process of the spacer 115S. The spacer 115S may serve to maintain the cell gap between the lower substrate (FIGS. 2-7) and the upper substrate (FIGS. 8-12).

Figure 12:
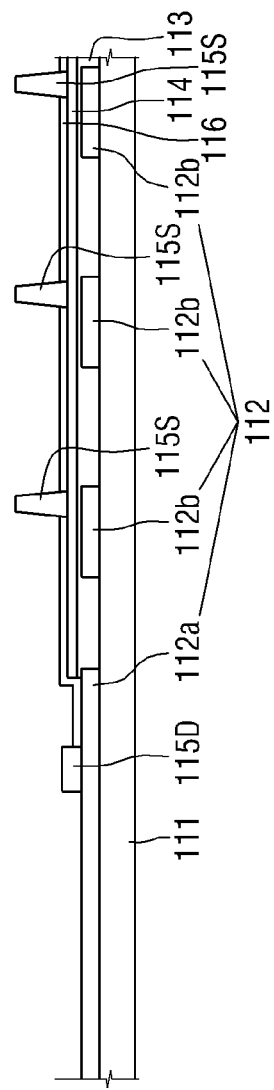

Referring to FIG. 12, after the spacer 115S and the second dam pattern 115D are formed, the second alignment layer 116 may be formed. The second alignment layer 116 may be a polyimide-based alignment layer in the same manner as the first alignment layer 137.

Organic polymer resin that forms the spacer 115S has no affinity with the second alignment layer 116, and thus the second alignment layer 116 is not coated on the surface of the spacer 115S. Accordingly, the second alignment layer 116 forms a coating layer on the common electrode 114, between the spacers 115S. In this process, a part of a side wall of the spacer 115S may come in direct contact with the second alignment layer 116, but it would be difficult that the second alignment layer 116 forms the coating layer on the side wall of the spacer 115S as substantially high as the height of the coating layer that is formed on the common electrode 114.

As described above, the second dam pattern 115D is made of the same material as the spacer 115S that has no affinity with the second alignment layer 116, and thus may act as the physical and chemical barriers with respect to the second alignment layer 116 in the same manner as the first dam pattern 134D. Accordingly, the second alignment layer 116 forms a coating layer on a portion of light blocking layer 112a in the second region between the dam pattern 115D and the common electrode 114.

Figure 13:
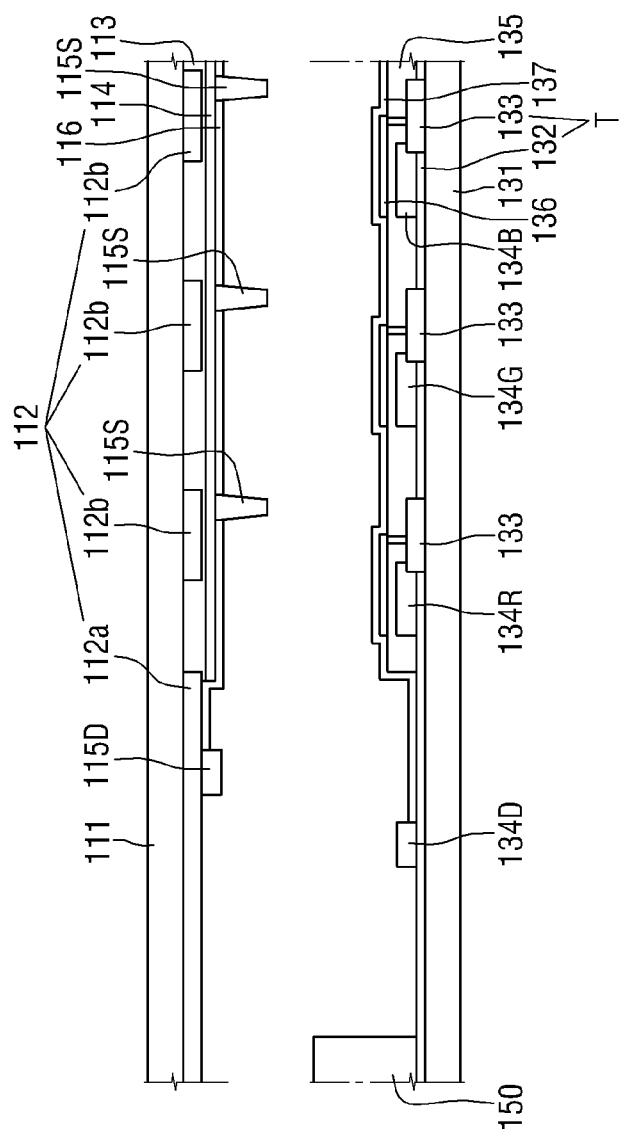

FIG. 13 schematically illustrates a process of combining the lower substrate of FIG. 6 and the upper substrate of FIG. 12 with each other.

As shown in FIG. 13, the liquid crystal display panel of FIG. 1 can be manufactured by combining the upper substrate of FIG. 12 with the lower substrate of FIG. 6 and injecting the liquid crystals 121 (FIG. 1) between them.

Figure 14:
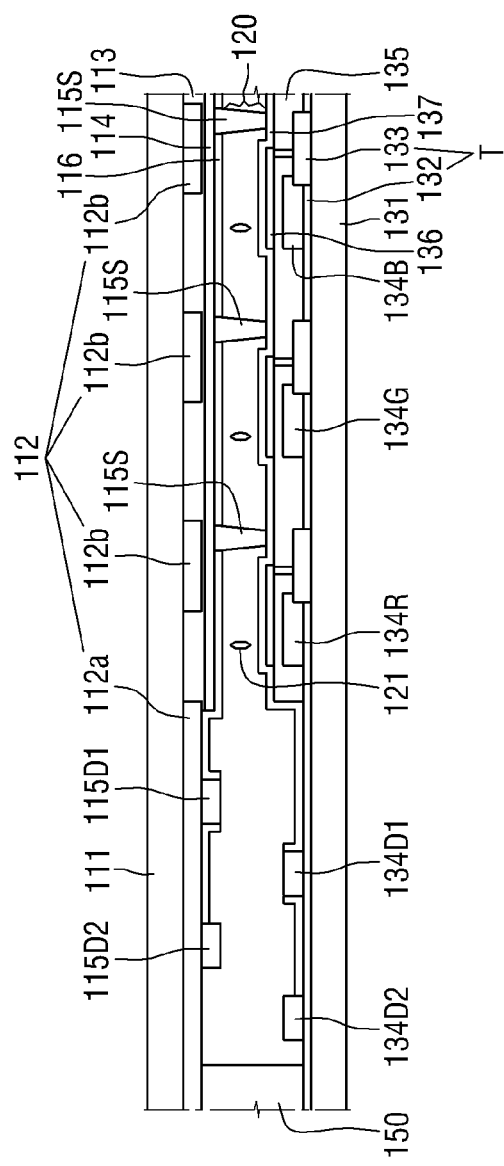
FIG. 14 is a cross-sectional view of a schematic portion of a liquid crystal display panel according to a second embodiment of the present invention.

FIG. 14 is a cross-sectional view of a schematic portion of a liquid crystal display panel according to a second embodiment of the present invention.

A liquid crystal display panel of FIG. 14 is different from the liquid crystal display panel of FIG. 1 on the point that two dam patterns 134D1 and 134D2 are formed on the first substrate 131 and two dam patterns 115D1 and 115D2 are formed on the second substrate 111.

Referring to FIG. 14, even if the alignment layer 137 flows to the dam pattern 134D2 over the dam pattern 134D1, the alignment layer 137 is not coated on the surface of the dam pattern 134D1. This is because the dam patterns 134D1 and 134D2 act as physical and chemical barriers with respect to the alignment layer 137 as described above.

In the same manner, even if the alignment layer 116 flows to the dam pattern 115D2 over the dam pattern 115D1, the alignment layer 116 is not coated on the surface of the dam pattern 115D1. This is because the dam patterns 115D1 and 115D2 act as physical and chemical barriers with respect to the alignment layer 116 as described above.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. A liquid crystal display panel comprising:
a first substrate;
a second substrate that is opposite to the first substrate;
a liquid crystal layer having liquid crystals between the first substrate and the second substrate, the liquid crystals being arranged in a first region of the first and second substrates;
a color filter layer disposed in the first region between the liquid crystal layer and the first substrate;
a silicon nitride (SiNx) planarization layer disposed in the first region between the liquid crystal layer and the color filter; and
a dam pattern arranged in a second region of the first and second substrates which surrounds a circumference of the first region as a region between the first substrate and the second substrate, the dam pattern being composed of a photoresist composite for manufacturing the color filter layer, an uppermost surface of the dam pattern having a contact angle that is equal to or larger than 17° and equal to or smaller than 85° with respect to distilled water, the uppermost surface of the dam pattern having no affinity for a polyimide-based layer, wherein the silicon nitride (SiNx) planarization layer does not exist on the uppermost surface of the dam pattern.

2. The liquid crystal display panel of claim 1, further comprising a stacked structure of a thin film transistor (TFT) layer formed between the liquid crystal layer and the first substrate, the color filter layer formed between the liquid crystal layer and the thin film transistor (TFT) layer, the silicon nitride (SiNx) planarization layer formed between the liquid crystal layer and the color filter layer, a pixel electrode formed between the liquid crystal layer and the planarization layer, and a polyimide-based alignment layer formed between the liquid crystal layer and the pixel electrode.

3. The liquid crystal display panel of claim 2, the planarization layer and the polyimide-based alignment layer forming an overlayer.

4. The liquid crystal display panel of claim 1, wherein the uppermost surface has a contact angle that is equal to or larger than 5° and equal to or smaller than 18° with respect to polyimide.

5. A liquid crystal display panel comprising:
a first substrate;
a second substrate that is opposite to the first substrate;
a liquid crystal layer having liquid crystals between the first substrate and the second substrate, the liquid crystals being arranged in a first region of the first and second substrates;
a stacked structure of a thin film transistor (TFT) layer formed between the liquid crystal layer and the first substrate, a color filter layer formed in the first region between the liquid crystal layer and the thin film transistor (TFT) layer, a silicon nitride (SiNx) planarization layer formed in the first region between the liquid crystal layer and the color filter layer, a pixel electrode formed between the liquid crystal layer and the planarization layer, and a polyimide-based alignment layer formed between the liquid crystal layer and the pixel electrode; and
a dam pattern arranged in a second region which surrounds a circumference of the first region as a region between the first substrate and the second substrate, the dam pattern being composed of a photoresist composite for manufacturing the color filter layer, wherein the silicon nitride (SiNx) planarization layer and the polyimide-based alignment layer do not exist on an uppermost surface of the dam pattern.

6. The liquid crystal display panel of claim 5, wherein the uppermost surface has a contact angle that is equal to or larger than 17° and equal to or smaller than 85° with respect to distilled water.

7. The liquid crystal display panel of claim 5, wherein the uppermost surface has a contact angle that is equal to or larger than 5° and equal to or smaller than 18° with respect to polyimide.

8. The liquid crystal display panel of claim 1, comprised of a polyimide-based alignment layer, the dam pattern having no affinity for the polyimide-based alignment layer solution such that the polyimide-based alignment layer does not exist on a surface of the dam pattern.

* * * * *